United States Patent [19]
Kelly et al.

[11] Patent Number: 5,073,875
[45] Date of Patent: Dec. 17, 1991

[54] METHOD OF ENHANCING GEOPHYSICAL DATA

[75] Inventors: Michael C. Kelly, Sand Springs; Richard O. Lindsay, Tulsa, both of Okla.

[73] Assignee: Amoco Corporation, Chicago, Ill.

[21] Appl. No.: 613,193

[22] Filed: Nov. 15, 1990

[51] Int. Cl.[5] .............................................. G01V 1/28
[52] U.S. Cl. ........................................ 367/38; 367/73
[58] Field of Search ...................... 367/38, 47, 59, 68, 367/73, 74, 21, 70; 364/421

[56] References Cited

U.S. PATENT DOCUMENTS

| | | | |
|---|---|---|---|
| 3,056,945 | 10/1962 | Horton | 367/47 |
| 3,781,785 | 12/1973 | Balch | 367/70 |
| 4,229,810 | 10/1980 | Thompson | 367/68 |
| 4,279,026 | 7/1981 | Lembright et al. | 367/70 |
| 4,577,298 | 3/1986 | Hinkley | 367/38 |
| 4,633,399 | 12/1986 | Stebens et al. | 364/421 |
| 4,945,519 | 7/1990 | Stanley et al. | 367/48 |

Primary Examiner—Ian J. Lobo
Attorney, Agent, or Firm—Timothy D. Stanley

[57] ABSTRACT

A method of enhancing geophysical data comprising processing the geophysical data into ordered gathers of seismic signals, transforming the seismic signals of each ordered gather into synthetic traces having reflection event amplitudes of only one polarity, combining the synthetic traces of each ordered gather, and restoring the positive and negative polarities to the reflection events in the combined synthetic traces.

16 Claims, 3 Drawing Sheets

METHOD OF ENHANCING GEOPHYSICAL DATA

BACKGROUND OF THE INVENTION

The present invention relates generally to the field of geophysical exploration and, more particularly, to a method for enhancing geophysical data so as to facilitate the identification and evaluation of subtle variations in the earth's subsurface formations.

In seismic exploration, a source or group of sources is used to impart seismic energy into the earth. A receiver or group of receivers is used to record signals representative of the earth's response to the imparted seismic energy. The recorded signal is generally referred to as a trace or seismic signal. The traces can be used to create a seismic section, i.e., a vertical cross-section of the subsurface of the earth.

Various techniques are used to filter or suppress "noise" (i.e., reception of portions of the imparted energy and other unwanted energy receptions) in the seismic signals that do not represent true reflections from geological features. One such technique is to combine seismic signals or traces from a common depth point (CDP) gather. This combining of traces is known as CDP stacking or summing. In geophysical exploration, displays of CDP stacked seismic signals are used to map the earth's subsurface formations. In order for such displays to convey credible information about the earth's subsurface formations, reflection events in the seismic signals must be visible.

A common problem in CDP stacking of seismic signals is that the polarity of the amplitudes of one or more of the reflection events, in the seismic signals representative reflection from a common point, can change from one seismic energy travel path to another (e.g., as between the seismic signals created by different source-receiver pairs). When this happens and the seismic signals are stacked, the reflection event amplitude can be reduced and may even disappear from the CDP stacked signals, i.e., the opposing polarities of reflection event amplitudes tend to cancel in the summation process.

In areas where the polarity of reflection event amplitudes change as a function of source-receiver separation distance, proper identification and evaluation of subtle changes in the earth's subsurface formations associated with such reflection events can be very difficult. Consequently, there exists a need for enhancing geophysical data whereby ordered gathers of seismic signals or traces can be combined without reducing or cancelling the amplitudes of reflection events. The present invention provides a novel method of processing geophysical data responsive to such need as more fully discussed below.

SUMMARY OF THE INVENTION

The present invention provides a novel method for enhancing geophysical data comprising the steps of processing the geophysical data into ordered gathers of seismic signals, transforming each seismic signal into synthetic trace having only one polarity, and combining synthetic traces of each ordered gather to form an enhanced trace. Additionally, positive and negative polarities can be restored to the enhanced trace. Preferably, corresponding reflection events in each ordered gather of seismic signals are aligned before transforming each seismic signal into a synthetic trace having reflection events with amplitudes of only one polarity. Additionally, the positive and negative polarities can be restored to the reflection event amplitudes of the summed synthetic traces employing a polarity trace representative of changes in the earth's subsurface formation. These and other benefits will be more fully discussed below.

BRIEF DESCRIPTION OF THE DRAWINGS

The present invention will be better understood by reference to the examples of the following drawings.

DETAILED DESCRIPTION OF THE INVENTION

The present invention provides a novel method for enhancing geophysical data so as to facilitate the identification and evaluation of subtle variations in the earth's subsurface formations.

In order to more completely understand the present invention, the following introductory comments are provided. In seismic exploration, various techniques have been developed to filter or suppress unwanted noise in the seismic data. One known technique comprises sorting the seismic data into common depth point (CDP) gathers of seismic signals; normal move out (NMO) correcting the CDP gather of the seismic signals so as to flatten or generally horizontally align corresponding reflection events therein; and combining the NMO corrected seismic signals by summing or stacking so as to constructively sum the amplitudes of corresponding reflection events in each of the seismic signals.

Figures 1A, 1B:
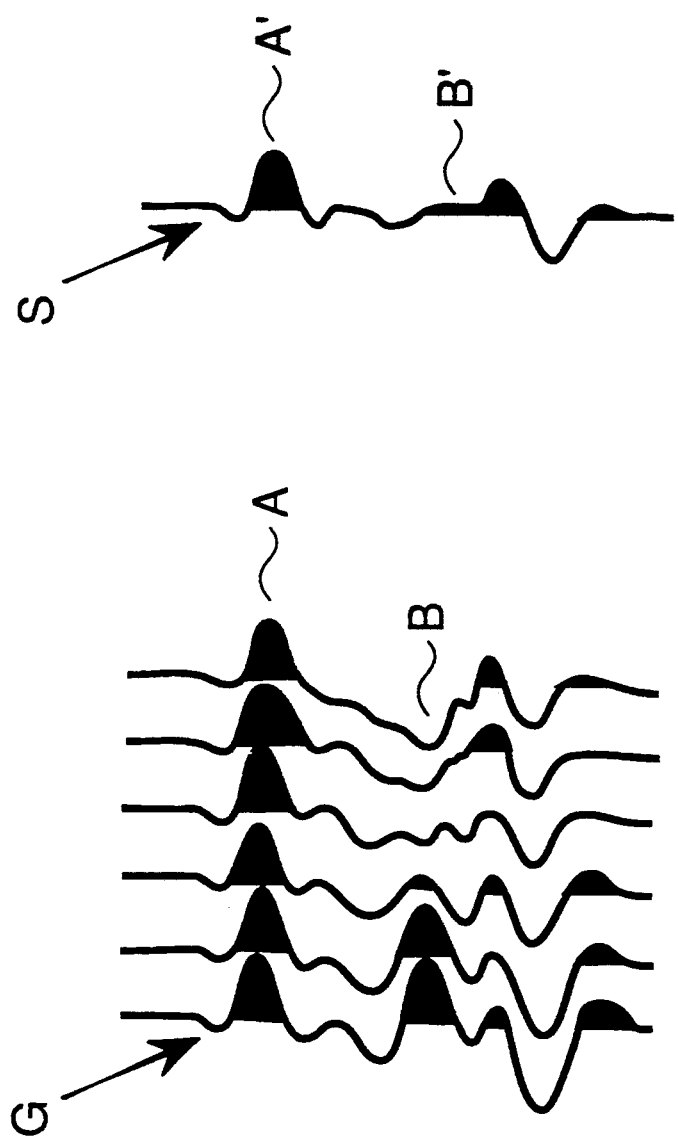
FIGS. 1a and 1b represent a common depth point (CDP) gather of seismic signals and its corresponding CDP sum, respectively.

FIG. 1a depicts an NMO corrected CDP gather of seismic signals G each having reflection events A and B. Typically, each seismic signal or trace comprises a plurality of reflection events having amplitudes with both positive and negative polarities, as depicted in FIG. 1a. Reflection events A and B each represent the reflection of the imparted seismic energy from separate common reflection points. FIG. 1b depicts a stacked signal S representing a sum of the seismic signals in the CDP gather G having corresponding reflection events A' and B'. In particular, it can be seen that the amplitude of reflection event A generally has the same polarity in each of the individual seismic signals in the CDP gather of seismic signals G. Consequently, reflection event A' in the stacked signal S is constructively summed. However, the amplitude of reflection event B has opposing polarities in the individual seismic signals in the CDP gather of seismic signals G. As such, reflection event B' in the stacked signal S is destructively summed. As a consequence, identifying and evaluating variations in the earth's subsurface formations associated with reflection events such as B' in displays of CDP stacked seismic signals can be quite difficult.

This change in polarity of reflection event amplitude as a function of changing source-receiver separation distance in CDP gathers of seismic signals is a common phenomenon in geophysical prospecting. Many factors can contribute to the variations in amplitude and polarity of corresponding reflection events in the traces of a CDP gather, such as the lithology of the earth's formation through which the imparted seismic energy travels.

Figure 2:
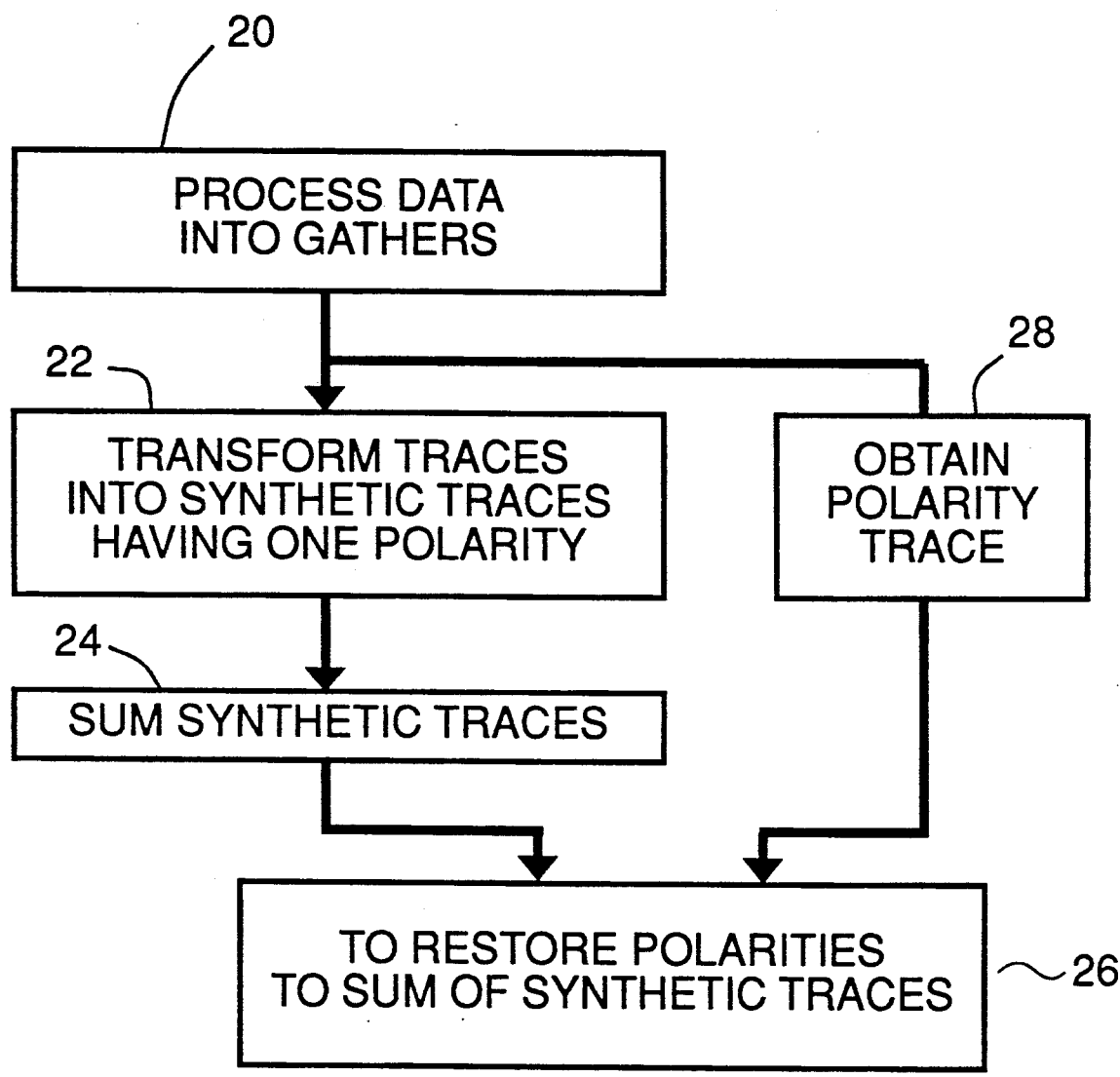
FIG. 2 represents a process flow diagram of the present invention.

Referring now to the flow diagram of FIG. 2, a novel method for enhancing geophysical data according to the present invention will now be generally described. The geophysical data are first processed into ordered gathers, or sets, of seismic signals or traces (e.g., common depth point, common end point, common offset, etc.) at step 20. Additionally, each ordered gather of seismic signals can be processed to generally flatten or align corresponding reflection events in each seismic signal to compensate for differences in traveltimes of the seismic energy resulting from differences in source-receiver pair offset distances (e.g., by normal moveout correction).

Figures 3A, 3B, 3C, 3D:
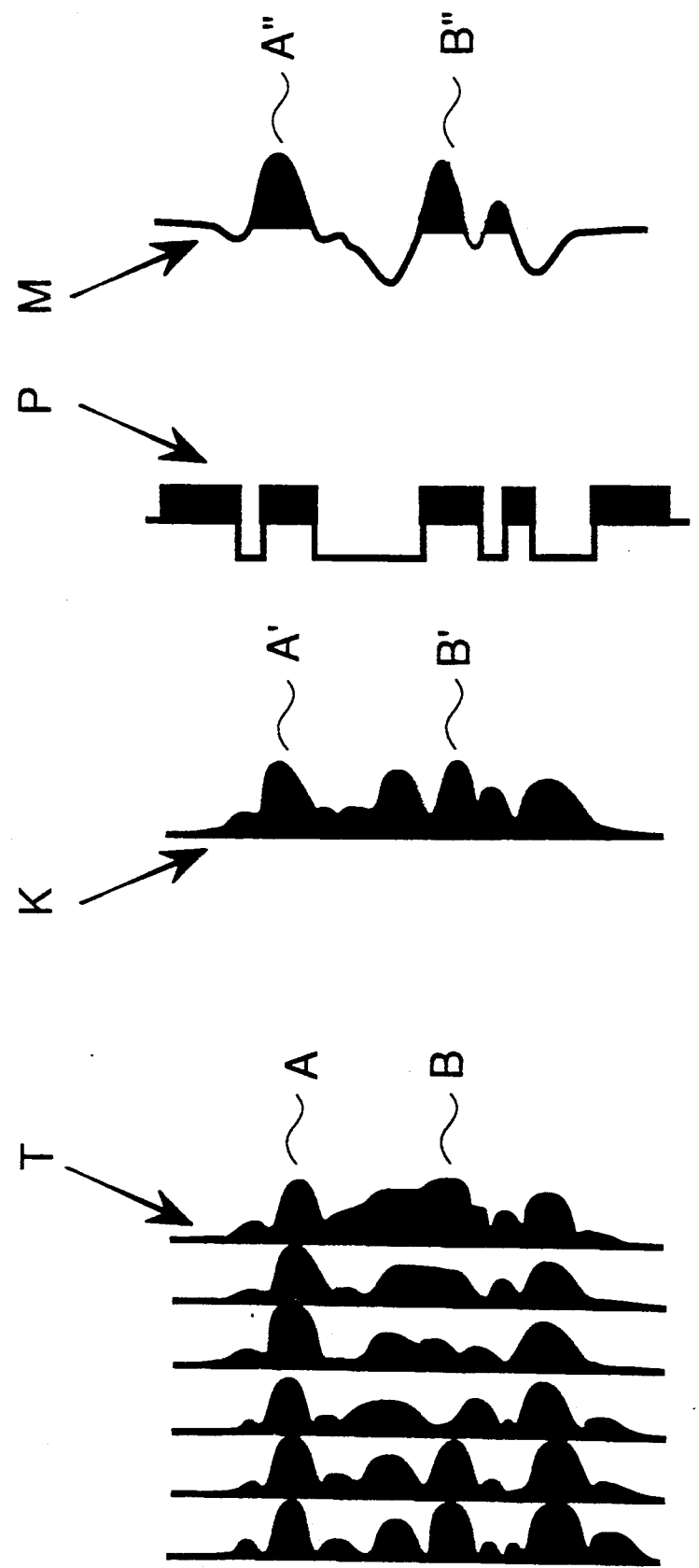
FIGS. 3a, b, c, and d represent a sequence of processing steps on the seismic signals from FIG. 1 according to the present invention.

At step 22, each seismic signal of the ordered gather is transformed into a synthetic trace wherein the reflection events have amplitudes of only one polarity. For example, the ordered gather of seismic signals or traces of FIG. 1a can be transformed into a set of synthetic traces T wherein the reflection events have all negative or positive amplitudes as depicted in FIG. 3a. It should be noted that reflection events A and B in the set of synthetic traces T correspond to those in FIG. 1a. Those skilled in the art will appreciate that there exists a variety of methods for obtaining such transformation (e.g., absolute value, exponentiating to an even numbered power, determining the amplitude envelope of each seismic signal, masking the sign bit in the digitized seismic signal, etc.).

At step 24 the set of synthetic traces T can be combined to provide a summed synthetic trace K, as depicted in FIG. 3b. While NMO correction of the seismic signals generally flattens and aligns corresponding reflection events in each of the seismic signals, and thus simplifies the summing process, those skilled in the art will appreciate that NMO correction is not a prerequisite to summing provided that the summing process follow the loci of traveltimes for corresponding reflection events in the ordered gather of seismic signals. Reflection events A' and B' in the summed synthetic trace K correspond to those depicted in FIG. 3a. At step 26 the positive and negative amplitude polarities can be restored to the reflection events in the summed synthetic trace K.

Preferably, reflection event amplitude polarities can be restored to the summed synthetic trace K using a method which includes step 28 at which a polarity trace P is obtained. As depicted in FIG. 3c, the polarity trace P comprises a step-like signal having amplitude values of ±1. The polarity trace P is adapted to represent the polarities of a seismic signal or trace which accurately describes the geological and lithological features of the earth's subsurface formations. Preferably, the polarity trace P can be obtained from a near-range seismic signal in the ordered gather of seismic signals (i.e., the seismic signal developed by a source-receiver pair having the shorter offset separation).

To restore polarity of the reflection event amplitudes in the summed synthetic trace K, the summed synthetic trace K can be multiplied with the polarity trace P. Care should be taken to ensure that the reflection events in the polarity trace P are properly aligned with the corresponding reflection events of the summed synthetic trace K. Restoring the polarities to the summed synthetic trace K provides an enhanced trace M which can provide a more accurate representation of the earth's subsurface formations, as depicted by reflection events A" and B" in FIG. 3d.

Looking more closely at FIGS. 3a and 3b, the step of summing or stacking the set of synthetic traces T reinforces amplitudes of both the reflection events A and B corresponding to those of original seismic signals. The summing of the synthetic traces T having only one polarity avoids the cancellation or reduction of reflection event amplitudes resulting from the change of polarities of reflection event amplitudes in the seismic traces, as depicted in FIG. 1b.

Comparing corresponding reflection events A' and B' of FIG. 1b with A" and B" of FIG. 3d illustrates the advantages and superior results of the present method for enhancing otherwise subtle variations in the seismic data. In particular, it can be seen that reflection event B" has a pronounced positive amplitude in FIG. 3d, while the corresponding reflection event B' in FIG. 1b has virtually disappeared due to the changes in the polarity of the amplitude of reflection event B in the individual traces of the gather. As such, identification and evaluation of variations in the earth's subsurface formation associated with reflection events can be more readily and accurately done in the enhanced trace M of FIG. 3d than in stacked seismic signal S of FIG. 1b.

While preferred embodiments of the present invention have been described herein for the purpose of disclosure, numerous changes in the performance of steps will suggest themselves to those skilled in the art. Nevertheless, the invention is to be understood as defined by the following claims.

What is claimed is:

1. A method for enhancing geophysical data, comprising the steps of:
    (a) sorting the geophysical data into ordered gathers of seismic signals;
    (b) transforming each seismic signal into a synthetic trace having only one polarity; and
    (c) combining the synthetic traces of each gather to form an enhanced trace for identifying and evaluating variations in the earth's subsurface formations.

2. The method of claim 1, further comprising the step of:
    restoring positive and negative polarities to the enhanced trace.

3. The method of claim 1, further including the steps of:
    (a) forming a polarity trace; and
    (b) restoring the positive and negative polarities to the enhanced trace with the polarity trace.

4. The method of claim 1, wherein the transforming step comprises:
    transforming each seismic signal into a synthetic trace having all positive amplitudes.

5. The method of claim 1, wherein the transforming step comprises:
    transforming each seismic signal into a synthetic trace having all negative amplitudes.

6. The method of claim 1, further including the steps of:
    (a) obtaining a polarity trace representative of changes in the earth's subsurface formations; and
    (b) obtaining a product of the polarity trace and the enhanced trace to restore the positive and negative polarities thereto.

7. The method of claim 3, wherein the step of forming a polarity trace comprises:
    (a) selecting a seismic signal from the ordered gather of seismic signals; and (b) creating a trace having amplitude values of ±1, representative of the positive and negative polarities of the selected seismic signal.

8. The method of claim 1, wherein the geophysical data are sorted into ordered gathers selected from the group including common depth point, common end point, and common offset.

9. The method of claim 7, wherein the selected seismic signal is a near offset signal in the ordered gather of seismic signals.

10. A method for enhancing geophysical data, comprising the steps of:
   (a) processing the geophysical data into ordered gathers of seismic signals having corresponding reflection events therein generally aligned;
   (b) transforming each seismic signal into a synthetic signal having reflection events of only one polarity; and
   (c) summing the synthetic signals to form an enhanced signal having enhanced reflection events for identifying and evaluating variations in the earth's subsurface formations.

11. The method of claim 10, further including the step of:
   restoring the positive and negative polarities of the reflection events in the enhanced signal.

12. The method of claim 10, wherein the step of transforming comprises processing the ordered gathers of seismic signals employing a polarity transformation technique selected from the group comprising rectifying, exponentiating to an even-numbered power, and obtaining an amplitude envelope of each seismic signal.

13. The method of claim 10, wherein the reflection event's polarity is positive.

14. The method of claim 10, wherein the reflection event's polarity is negative.

15. The method of claim 11, wherein the step of restoring comprises:
   (a) obtaining a polarity trace from the ordered gather of seismic signals; and
   (b) combining the polarity trace with the enhanced signal.

16. The method of claim 10, wherein the seismic signals are processed into ordered gathers selected from the group including common end point, common depth point, and common offset.

* * * * *